Patented Feb. 22, 1949

2,462,572

UNITED STATES PATENT OFFICE 2,462,572

VULCANIZING RUBBERY BUTADIENE POLYMERS WITH DIXANTHIC DISULFIDES

Monte C. Throdahl, Nitro, W. Va., assignor to Monsanto Chemical Company, St. Louis, Mo., a corporation of Delaware No Drawing. Application September 22, 1944, Serial No. 555,399

15 Claims. (Cl. 260—79)

The present invention relates to a method of treating synthetic rubber-like materials. More particularly this invention relates to a method of vulcanizing synthetic rubber-like materials to obtain vulcanizates of superior properties.

This invention is applicable to synthetic rubber-like materials of the type prepared by the polymerization of a material which consists predominately of a butadiene hydrocarbon as for example butadiene, isoprene or dimethyl butadiene, and which may also contain other compounds capable of copolymerizing with conjugated butadiene hydrocarbons. Typical examples of the latter are aryl olefines such as styrene and vinyl naphthalene and acrylic nitriles such as acrylonitrile and methacrylonitrile. Throughout the specification the term synthetic rubber refers only to synthetic rubber-like materials of this type.

While synthetic rubbers possess many valuable properties being superior to natural rubber in some respects, it is well known that they are deficient in resisting continued hardening upon exposure to heat. The rubber is deficient in flex life and chips and cracks when flexed at either ordinary or elevated temperatures.

An object of the present invention is to improve synthetic rubber. A particular object is to prepare a synthetic rubber which is resistant to heat hardening. A further object is to increase the flex life of synthetic rubber. A still further object is to provide a method of vulcanization whereby improved vulcanizates are produced. Another object is to provide a class of materials for treating synthetic rubber which have the property of improving the rubber in one or more important respects. Still other objects will be apparent from the description following.

These objects are accomplished in accordance with the present invention by treating the synthetic rubber with a small amount of an organic mercaptan in conjunction with a dixanthic disulfide vulcanizing agent. Dixanthic disulfides or more particularly compounds possessing the structure

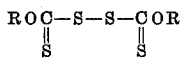

where the R's are organic radicles are valuable vulcanizing agents for synthetic rubber. The vulcanizates resemble natural more closely than corresponding sulfur vulcanizates, especially as regards elasticity and retention of elasticity upon exposure to heat. The addition to the rubber of a small amount of a mercaptan in addition to the xanthic disulfide vulcanizing agents further enhances the resistance of the rubber to flex cracking. This is particularly noteworthy since the vulcanizates obtained by use of dixanthic sulfides are more resistant to flex cracking than ordinary sulfur vulcanizates even in the absence of a mercaptan.

Very small amounts of mercaptan exert a profound influence on the flex cracking resistance. 0.1 per cent on the rubber is usually sufficient to bring about a noticeable improvement and is about the optimum proportion for the most active mercaptans. Short chain alkyl mercaptans, as for example mercaptans of chain length less than six carbon atoms, and aromatic mercaptans have proved to be most effective. Somewhat larger quantities of the longer chain mercaptans like heptyl mercaptan and lauryl mercaptan are necessary. Thus, the addition of 1.0 percent on the rubber of either lauryl or heptyl mercaptan has been found to increase the flex life of butadiene-styrene copolymer vulcanized with a dixanthic disulfide. While amounts in excess of 1.0 per cent can be used there is in general no advantage of such increased amounts.

A wide variety of mercaptans whether aryl, alkyl or aralkyl mercaptans, can be used in the practice of this invention. Typical examples are ethyl mercaptan, propyl mercaptan, amyl mercaptan, mercapto acetic acid, benzyl mercaptan, thio β-naphthol, thio phenol, tetra hydro naphthyl methyl mercaptan, mercapto methyl naphthalene, 1-mercapto methyl 4-isopropyl benzene 1-mercapto methyl 2,4,6-triisopropyl benzene and p-tertiary butyl mercapto benzene. The mercaptan may be employed in conjunction with any xanthic disulfide of the structure

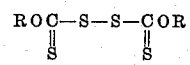

as a vulcanizing agent. Typical examples of R are cyclohexyl, octyl, hexyl, amyl, butyl, isopropyl, ethyl and methyl.

The following examples illustrate preferred embodiments of the invention and explain the practice of this invention but they are not to be taken as limitative of the invention.

A base stock was compounded comprising

| | Parts by weight |
|---|---|
| Buna S [1] | 100 |
| Carbon black | 40 |
| Zinc oxide | 3 |
| Mineral rubber | 4 |
| Saturated hydrocarbon softener | 3 |
| Ethyl xanthic disulfide | 4 |
| N-cyclohexyl 2-benzothiazole sulfenamide | 1.75 |

[1] Copolymer of butadiene-1,3 and styrene.

From the base stock so compounded typical stocks were prepared according to the principles of this invention by adding 0.1 part by weight of various mercaptans. The stocks so compounded were cured in the usual manner by heating in a press for 30 and 60 minutes at 141.5° C. The flex-cracking resistance of the vulcanized products was determined on an India flexing machine described by Torrance and Peterson, India Rubber World, 80, 62 (1929). While standard India flexing specimens were employed, the procedure was varied in conformity with that found to give more reproducible results with synthetic rubber. A 3/32" slit was cut in the center of the flexing specimen and the rate of growth of this slit determined. Measurements were in 64ths inch at various kilocycles until failure. The speed of the rotor was approximately ten cycles per second. The flexing was carried out in an atmosphere of air at 90° C. provided by means of resistance heaters within an insulated cover over the entire rotating mechanism. The fanning action of the specimens on the periphery of the rotor was sufficient to maintain an even temperature.

| Mercaptan | Width of slit in 64ths inch of 30 min. cures at — | | | | | |
|---|---|---|---|---|---|---|
| | 6 Kilocycles | 15 Kilocycles | 21 Kilocycles | 27 Kilocycles | 45 Kilocycles | 65 Kilocycles |
| None | 16 | 26 | 36 | 50 | | |
| Xylyl mercaptan | 10 | 16 | 20 | 24 | 40 | 55 |
| p-Thio cresol | 10 | 12 | 14 | 19 | 30 | 40 |
| t-Butyl mercaptan | 12 | 18 | 23 | 30 | 38 | 56 |
| n-Butyl mercaptan | 14 | 22 | 26 | 35 | 52 | |

| Mercaptan | Width of slit in 64ths inch of 60 min. cures at — | | | | | |
|---|---|---|---|---|---|---|
| | 6 Kilocycles | 9 Kilocycles | 12 Kilocycles | 21 Kilocycles | 27 Kilocycles | 40 Kilocycles |
| None | 34 | 50 | | | | |
| Xylyl mercaptan | 15 | 20 | 22 | 32 | 40 | |
| p-Thio cresol | 10 | 10 | 12 | 20 | 26 | 50 |
| t-Butyl mercaptan | 12 | 14 | 14 | 26 | 32 | 48 |
| n-Butyl mercaptan | 18 | 20 | 26 | 44 | 56 | |

Obviously, practice of this invention is not limited to the specific compositions set forth to illustrate the invention. The accelerators, activators, softeners and other ingredients used in conjunction with mercaptan and xanthic disulfide can vary widely. Likewise, the method of adding the mercaptans can vary. They may be added to a latex of the synthetic rubber before coagulation or applied to the surface of a mass of the crude rubber or rubber vulcanized by heating in the presence of a xanthic disulfide. The preferred procedure is to add the mercaptan along with the vulcanizing agent.

The present invention is limited solely by the claims attached hereto as part of the present specification.

What is claimed is:

1. A method of vulcanizing a vulcanizable rubbery polymer of a group consisting of polymers of butadiene-1,3 and methyl substitution products thereof and copolymers of these with copolymerizable aryl olefines and acrylonitriles which comprises adding to said rubbery polymer a dixanthic disulfide vulcanizing agent comprising a compound containing the nucleus

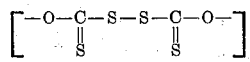

attached to saturated hydrocarbon groups and 0.1–1.0% of an organic mercaptan of the group consisting of alkyl mercaptans, aralkyl mercaptans and aryl mercaptans and heating the mixture at vulcanizing temperature in the absence of elemental sulfur for a time sufficient to effect a cure at least equivalent to 30 minutes at 141.5° C.

2. A method of vulcanizing a vulcanizable rubbery copolymer of butadiene-1,3 and styrene which comprises adding to said rubbery polymer a dixanthic disulfide vulcanizing agent comprising a compound containing the nucleus

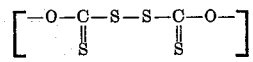

attached to saturated hydrocarbon groups and 0.1%–1.0% of an alkyl mercaptan of less than six carbon atoms and heating the mixture at vulcanizing temperature in the absence of elemental sulfur for a time sufficient to effect a cure at least equivalent to 30 minutes at 141.5° C.

3. A method of vulcanizing a vulcanizable rubbery copolymer of butadiene-1,3 and styrene which comprises adding to said rubbery polymer a dixanthic disulfide vulcanizing agent comprising a compound containing the nucleus

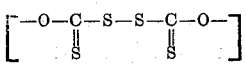

attached to saturated hydrocarbon groups and 0.1%–1.0% of an aromatic mercaptan and heating the mixture at vulcanizing temperature in the absence of elemental sulfur for a time sufficient to effect a cure at least equivalent to 30 minutes at 141.5° C.

4. A method of vulcanizing a vulcanizable rubbery copolymer of butadiene-1,3 and styrene which comprises adding to said rubbery polymer a dixanthic disulfide vulcanizing agent comprising a compound containing the nucleus

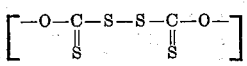

attached to saturated hydrocarbon groups and 0.1%–1.0% of an aromatic mercaptan containing an alkyl group and heating the mixture at vulcanizing temperature in the absence of elemental sulfur for a time sufficient to effect a cure at least equivalent to 30 minutes at 141.5° C.

5. A method of vulcanizing a vulcanizable rubbery copolymer of butadiene-1,3 and styrene which comprises adding to said rubbery polymer di(ethyl xanthic) disulfide and 0.1%–1.0% of butyl mercaptan and heating the mixture at vulcanizing temperature in the absence of elemental sulfur for a time sufficient to effect a cure at least equivalent to 30 minutes at 141.5° C.

6. A method of vulcanizing a vulcanizable rubbery copolymer of butadiene-1,3 and styrene which comprises adding to said rubber polymer di(ethyl xanthic) disulfide and 0.1%–1.0% of xylyl mercaptan and heating the mixture at vulcanizing temperature in the absence of elemental sulfur for a time sufficient to effect a cure at least equivalent to 30 minutes at 141.5° C.

7. A method of vulcanizing a vulcanizable rubbery copolymer of butadiene-1,3 and styrene which comprises adding to said rubbery polymer di(ethyl xanthic) disulfide and 0.1%–1.0% of p-thio cresol and heating the mixture at vulcanizing temperature in the absence of elemental sulfur for a time sufficient to effect a cure at least equivalent to 30 minutes at 141.5° C.

8. The vulcanized product obtained by adding in amount within the range of 0.1%–1.0% on the polymer of an organic mercaptan of the group consisting of alkyl mercaptans, aralkyl mercaptans and aryl mercaptans to a vulcanizable rubbery polymer of a group consisting of polymers of butadiene-1,3 and methyl substitution products thereof and copolymers of these with copolymerizable aryl olefines and acrylonitriles and heating with a dixanthic disulfide vulcanizing agent containing the nucleus

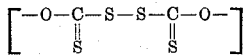

attached to saturated hydrocarbon groups at vulcanizing temperature in the absence of elemental sulfur for a time sufficient to effect a cure at least equivalent to 30 minutes at 141.5° C.

9. The vulcanized product obtained by adding in amount within the range of 0.1%–1.0% on the polymer of an alkyl mercaptan of less than six carbon atoms to a vulcanizable rubbery copolymer of butadiene-1,3 and styrene and heating with a dixanthic disulfide vulcanizing agent containing the nucleus

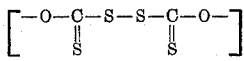

attached to saturated hydrocarbon groups at vulcanizing temperatures in the absence of elemental sulfur for a time sufficient to effect a cure at least equivalent to 30 minutes at 141.5° C.

10. The vulcanized product obtained by adding in amount within the range of 0.1%–1.0% on the polymer of an aromatic mercaptan to a vulcanizable rubbery copolymer of butadiene-1,3 and styrene and heating with a dixanthic disulfide vulcanizing agent containing the nucleus

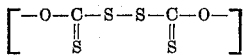

attached to saturated hydrocarbon groups at vulcanizing temperatures in the absence of elemental sulfur for a time sufficient to effect a cure at least equivalent to 30 minutes at 141.5° C.

11. The vulcanized product obtained by adding in amount within the range of 0.1%–1.0% on the polymer of an aromatic mercaptan containing an alkyl group to a vulcanizable rubbery copolymer of butadiene-1,3 and styrene and heating with a dixanthic disulfide vulcanizing agent containing the nucleus

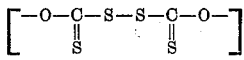

attached to saturated hydrocarbon groups at vulcanizing temperatures in the absence of elemental sulfur for a time sufficient to effect a cure at least equivalent to 30 minutes at 141.5° C.

12. The vulcanized product obtained by adding in amount within the range of 0.1%–1.0% on the polymer of butyl mercaptan to a rubbery copolymer of butadiene-1,3 and styrene and heating with di(ethyl xanthic) disulfide vulcanizing agent at vulcanizing temperatures in the absence of elemental sulfur for a time sufficient to effect a cure at least equivalent to 30 minutes at 141.5° C.

13. The vulcanized product obtained by adding in amount within the range of 0.1%–1.0% on the polymer of xylyl mercaptan to a rubbery copolymer of butadiene-1,3 and styrene and heating with di(ethyl xanthic) disulfide vulcanizing agent at vulcanizing temperatures in the absence of elemental sulfur for a time sufficient to effect a cure at least equivalent to 30 minutes at 141.5° C.

14. The vulcanized product obtained by adding in amount within the range of 0.1%–1.0% on the polymer of p-thio cresol to a rubbery copolymer of butadiene-1,3 and styrene and heating with di(ethyl xanthic) disulfide vulcanizing agent at vulcanizing temperatures in the absence of elemental sulfur for a time sufficient to effect a cure at least equivalent to 30 minutes at 141.5° C.

15. The method of vulcanizing a vulcanizable rubbery copolymer of butadiene-1,3 and styrene which comprises adding to said copolymer a dixanthic disulfide vulcanizing agent containing the nucleus

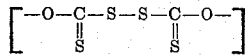

attached to saturated hydrocarbon groups and 0.1%–1.0% of an organic mercaptan of the group consisting of alkyl mercaptans, aralkyl mercaptans and aryl mercaptans and heating the mixture at vulcanizing temperatures for a time sufficient to effect a cure at least equivalent to 30 minutes at 141.5° C.

MONTE C. THRODAHL.

REFERENCES CITED

The following references are of record in the file of this patent:

UNITED STATES PATENTS

| Number | Name | Date |
|---|---|---|
| 2,234,204 | Starkweather | Mar. 11, 1941 |